United States Patent

[11] 3,623,120

[72] Inventor Abraham Lichowsky
 Los Angeles, Calif.
[21] Appl. No. 744,059
[22] Filed July 11, 1968
[45] Patented Nov. 23, 1971
[73] Assignee Radio Corporation of America

[54] MAGNETIC DRUM SYSTEM
 12 Claims, 4 Drawing Figs.
[52] U.S. Cl. .................................................. 346/74 M,
 179/100.2 A, 340/174.1 C, 346/74 MD, 346/138
[51] Int. Cl. ...................................................... G11b 25/02,
 G11b 5/76
[50] Field of Search .......................................... 346/74 M,
 70, 138; 340/174.1 C; 179/100.2 A

[56] References Cited
 UNITED STATES PATENTS
3,138,848 6/1964 Cheney ........................ 346/138 X
3,174,152 3/1965 Maclay ......................... 346/74

Primary Examiner—Bernard Konick
Assistant Examiner—Gary M. Hoffman
Attorney—H. Christoffersen ABSTRACT: Lightweight, thin-walled magnetic drum, without center shaft, in heavy-walled, rigid housing. Flexure elements under stress which act as end walls of the drum are each fixed to a bearing race. Another race of each bearing is fixed to the housing. Differential expansion and other misalignments between the drum and housing are taken up equally by these flexure elements. At the drum ends, any thermally induced axial misalignment which occurs between magnetic heads and their tracks on the drum is one-half that of conventionally mounted magnetic drums of the same length, and at the drum center there is no misalignment.

PATENTED NOV 23 1971 3,623,120

INVENTOR
ABRAHAM LICHOWSKY
BY H. Christoffersen
ATTORNEY

MAGNETIC DRUM SYSTEM

BACKGROUND OF THE INVENTION

A conventionally designed magnetic drum revolves around a rigid shaft which has bearings mounted on each of its ends. The bearings at one end are fixed to the supporting structure. The bearings at the other end are free to slide in the axial direction relative to the supporting structure to allow freedom of motion of the drum when it expands or contracts in this direction. Such motion occurs when the drum is heated or cooled relatively to its supporting structure. With the drum supported in this way, magnetic head-to-track misregistration at one end of the drum approaches zero, whereas at the opposite end, thermal strains and thermal head-to-track misregistration are proportional to the length of the drum.

In a conventionally mounted drum, as described above, wear of the bearings contributes to axial misalignment of the bearings. Errors in the perpendicularity of the bearing races severely increase the peak stresses to which the bearings are subjected and this limits the bearing life and reliability. Furthermore, conventionally mounted drums often become overstressed even in normal operation because the drums, in practice, are not perfectly symmetrical and therefore are not perfectly balanced during rotation. The bearings in such drums are also critically sensitive to shock and vibration loads such as may be induced during shipment or when undergoing normal maintenance, or when operated in military and aerospace environments.

Many of the problems associated with conventional drums are interrelated and become severely compounded with increases in drum size. For instance, the heavier the drum assembly, the larger the bearings required to support it. The larger bearings require increased preloading and this, in turn, increases the load on the motor driving the drum. This leads to more power dissipation and often to greater thermal gradients within the drum housing and to greater misalignments between the fixed and moving parts of the drum system. Further, the large thermal capacity of the heavier drum makes it very sensitive to thermal shock. In addition to all this, larger bearings required to support the heavier drum cannot be manufactured with the same absolute tolerances as the smaller ones. The result of all of these factors is not only a decrease in the performance of the drum system but also, because there is an increased amount of axial misalignment between the drum and the heads, there has to be a corresponding reduction in the surface recording density (wider tracks and wider guard bands are needed), thus defeating to some extent the reason (increased storage capacity) for making the drum larger in the first place.

Potentially, drums are one of the most reliable forms of electromechanical memory known today. They are also capable of very rapid access times and relatively low cost per bit. However, the demand for greater memory capacity in conventional drums has resulted, in many cases, in monstrous mechanical assemblies which cannot compete with other memory devices either on an economic or a reliability basis.

It is the object of this invention to provide a magnetic drum system in which the many deficiencies mentioned above are either eliminated or greatly lessened—a system in which the relative amount of head-to-track misregistration is reduced and which has such additional operating advantages as high reliability, low differential expansion between the drum and its housing, minimal bearing loading, the ability to withstand shock and vibration, simple assembly and maintenance without critical manufacturing tolerances, and so on.

SUMMARY OF THE INVENTION

According to one feature of the present invention, the drum is prestressed in the axial direction and is maintained in its stressed condition during rotation of the drum. Such stressing may be achieved by making the drum ends flexure elements which are each fixed to, for example, a bearing race, fixing another race of each bearing to the housing, and, for example, pulling one bearing away from the other in the axial direction of the drum.

According to another feature of the invention, the drum is lightweight and has a relatively thin cylindrical wall spaced very close to the relatively heavy wall of the drum housing. With this type of structure, heat from the housing is transferred to the drum and vice versa, during operation, by forced convection and radiation and very little temperature differential exists between the drum and its housing.

A further feature of the invention is the mounting of the end walls to the housing. As mentioned above, each flexure end wall is fixed to a bearing assembly and the bearing assemblies, in turn, are fixed to the housing. Should there be any differential expansion between the drum and its housing, it is taken up in the flexure elements and any misalignment between the magnetic heads (which are mounted in the housing) and their tracks on the drum is, in the worst case, only one-half that of conventional drums of the same length.

DETAILED DESCRIPTION

Figure 1:
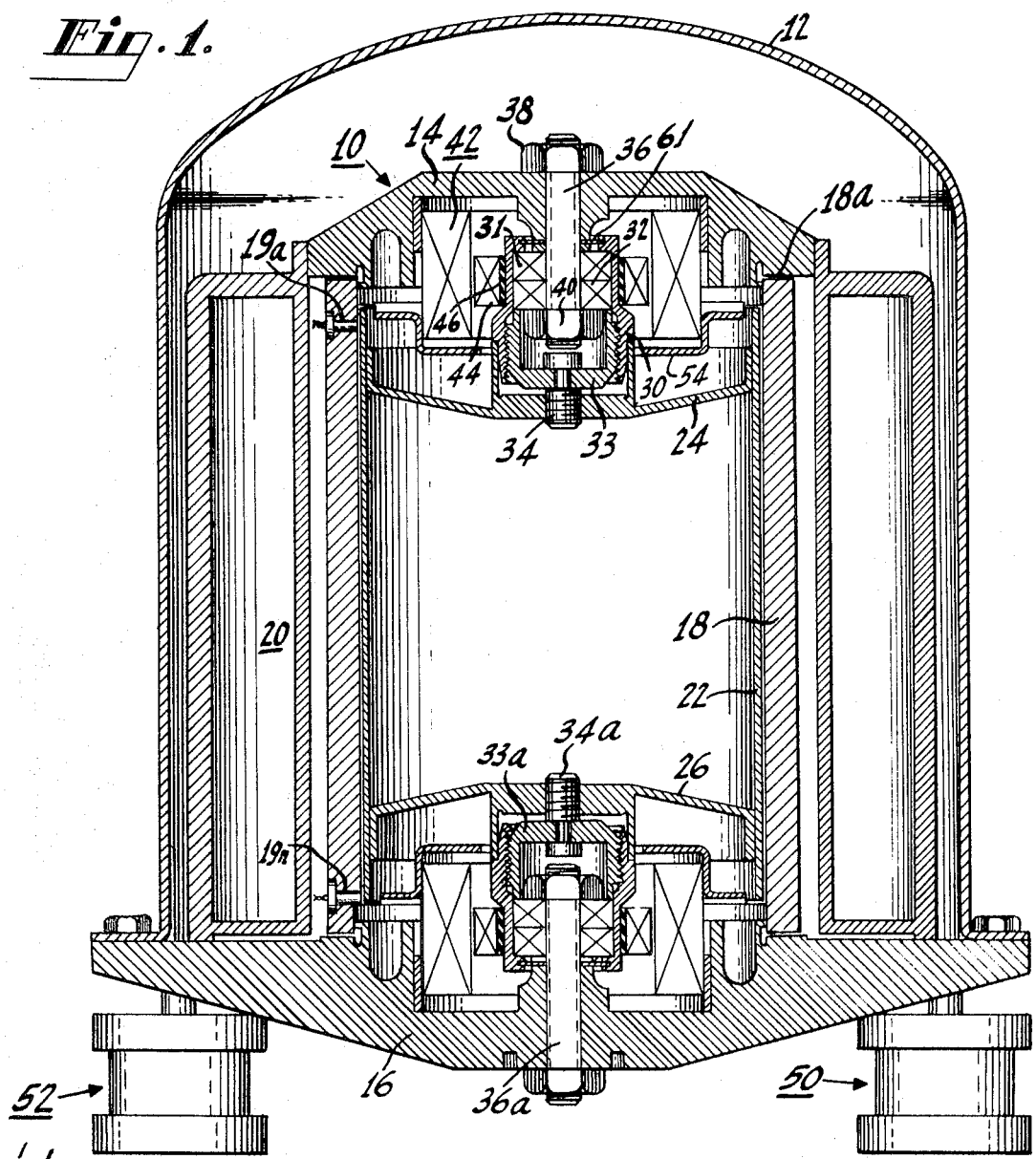
FIG. 1 is a cross-sectional view of the drum of the invention.

The drum shown in FIG. 1 includes a heavy-walled housing 10 located within a sealed container 12. The housing includes end walls 14 and 16 and a cylindrically shaped wall 18. A plurality of magnetic heads 19a, 19b...19n, two of which 19a and 19n are shown, are mounted in the wall 18 along the length of the wall. The circuits associated with the drum are not shown but they may be located within the annular frame 20.

The drum itself, shown at 22, is formed of a lightweight substance such as aluminum and its thickness may be 0.06 inch for small diameter drums of about 6 or so inches in diameter. The drum is spaced from the cylindrically shaped wall 18 only a very small distance—of the order of 0.01 to 0.03 inches. The wall 18 is many times thicker than the shell and, for example, may be 0.5 inches in thickness.

The end walls 24 and 26 of the drum should have the same coefficient of expansion as the drum and may be of the same thickness as the drum and formed of the same material as the drum. These end walls act as flexure elements, as will be discussed shortly. These end walls are conically shaped and are at an angle of about 70° to 87° relative to the drum axis to provide the desired amount of axial stiffness. (The more acute the cone angle, the stiffer the end wall structure.) As will also be explained shortly, the end walls 24 and 26 are placed under stress at the factory by relatively pulling these end walls outwardly, that is, in the direction away from the drum center.

The drum is symmetrically mounted within the housing at the opposite ends thereof. Therefore, only the mounting at one end of the housing will be discussed in detail. The end wall 24 is held to the bearing housing 30 by means of the pulldown screw 34 which is captive in the bearing nut 33. The nut 33 screws into the bearing housing 30. The housing, in turn, is fixed to the outer races of the dual bearing 31, 32 (a duplex pair).

A hollow shaft 36 passes through an opening in the end wall 14 of the housing. The outer diameter of this shaft is slightly greater than that of the inner diameter of the inner races of the dual bearings 31, 32. However, as the shaft is hollow, it is resilient and may be force-fitted into the dual bearing. The shaft wall is sufficiently thin to take up most of the interference fit deflection, thus avoiding serious deformation of the bearing inner races even with relatively loose manufacturing tolerances. After assembly and the tightening steps to be described, there is no clearance between the dual bearing and shaft 36. Nuts 38 and 40 are located at opposite ends of the shaft 36.

There are identical motors (such as alternating current induction motors) located at opposite ends of the drum for driving the drum. They operate concurrently at the same speed and since the motors may be chosen so that either motor is able by itself to drive the system, this increases the system reliability. The symmetrical positioning of the motors also provides balanced heat distribution and flow and far smaller temperature gradients in the housing and drum than would be the case if there were only a single motor mounted at one end of the drum.

Each motor includes a stator 42 and a rotor 44. The rotor is mounted on the bearing housing 30 and a resilient gasket 46 may be located between these elements. The stator 42 is fixed to the housing. The annular element 54 is formed of a magnetic field shielding material. Its function is to shield the drum and recording heads from the magnetic field produced by the motor.

The entire structure is supported on shock mounts, two of which are shown at 50 and 52. Each such shock mount includes metal end caps and a center resilient section which may be formed of rubber or the like.

In the factory adjustment of the drum of the invention, after all of the parts of the drum and housing are assembled as shown, except for the assembly which includes the end wall 14, the motor 44, 42 and the bearing assembly, a precise measurement is made of the differential height between the seating surface 18a of the end of wall 18 (against the end wall 14) and the seating surface of the central cylindrical portion of the drum end 24 against the flange of bearing housing 30. Shims are then placed in the region 61 between the end wall 14 and its bearing assembly to establish a predetermined gap between the seating surfaces on the drum end wall 24 and the bearing assembly 30, equal to the deflection of the drum end walls 24 and 26 after the assembly is completed.

Figure 2:
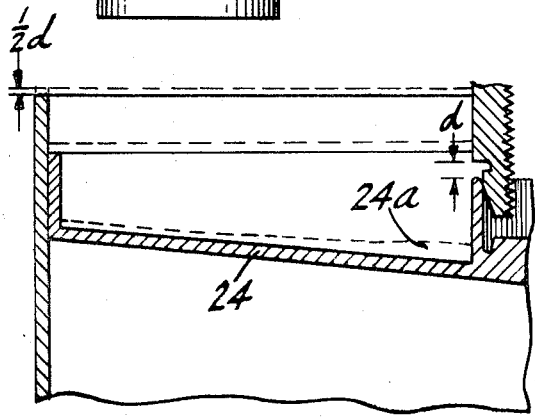
FIG. 2 is a cross-sectional view of a portion of one of the flexure elements.

After the adjustments above, the end wall assembly 14 is mounted onto the housing and an Allen-head wrench having a long shank is inserted into the opening in shaft 36 and is made to engage the Allen-head screw 34. The screw is then tightened. This places the flexible end walls 24 and 26 under stress by drawing the center of end wall 24 toward the housing end wall 14. Referring to FIG. 2, which exaggerates the amount of end wall displacement, the end wall 24 is pulled upward a distance d (of the order of a few thousandths of an inch) to the dotted line position shown at 24a. The end wall 26 (FIG. 2) is simultaneously stressed.

There is very little differential expansion between the drum and the housing. The reasons are that there is a very small distance between the drum and the housing wall 18 and the drum is very thin compared to the housing. When one element gets hotter than the other, heat is transmitted to the other element very quickly through the space between these elements both by forced convection and radiation. The thermal capacity and time constant (referred to the environment outside the seal cover 12) of the housing is very high compared to the thermal capacity and time constant (referred to the housing) of the drum. This insures excellent temperature tracking of the drum with reference to the housing (both elements, in other words, always tend to be at nearly the same temperature) and excellent immunity to thermal shock environments.

Figures 3A, 3B:
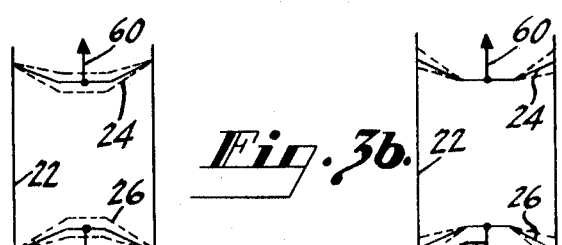
FIGS. 3a and 3b are schematic showings of how differential expansion between the housing and drum affects the drum position.

Any differential expansion which tends to occur is taken up in the flexible end walls 24 and 26 in the manner shown schematically in FIGS. 3a and 3b. The arrows 60 and 62 indicate the directions in which the end members 24 and 26 are stressed. When the housing expands and contracts, the movement is taken up almost entirely in the end walls and the dimensions of the drum cylinder do not change significantly. This is shown in FIG. 3a. In FIG. 3b it may be observed that when the drum expands and contracts, this movement too is taken up in the end walls 24 and 26.

In a conventional drum which is fixed at only one end to the drum shaft and which is free to move relatively to the drum shaft at its other end, the amount of movement of a track relative to its head approaches zero at one end of the drum and is proportional to the drum length at the opposite, that is, the free end of the drum. In the arrangement of the present invention, because the structure is balanced and because the bearings of the drum are fixed to the housing at both ends of the drum, there is zero displacement between the magnetic head and its track at the center of the drum even if there should be differential expansion between the drum and the housing. The maximum displacement between a head and its track occurs at both ends of the drum, the amount of such displacement is also proportional to the drum length; however, it will only be one-half that of a conventional drum of the same length for the same thermal differentials. Thermal expansion effects also have been found to be negligible for the drum system of the invention over a wide temperature range.

As mentioned above, the axial preloading of the drum of the invention tends to pull the end members 24 and 26 outwardly. Placing these members under stress stiffens the drum structure and raises the resonant frequency of the drum and this improves its immunity to vibration and shock.

There are many modes of vibration possible in the drum structure. The higher frequency modes are of minor concern if the drum material has sufficient self-damping qualities or if paint-on type damping coatings are applied. Proper design of the drum end walls will result in a system where only one low frequency resonance is within or near the spectrum of interest. This resonance frequency is due to the mass of the drum and the compliance of the end walls oscillating longitudinally along the axis of rotation.

The resonance frequency may be increased by reducing the compliance of the end walls. However, the preferred method for accomplishing this is stressing the cone-shaped end walls rather than decreasing the angle of the cones. A relatively low and not exactly predictable frequency usually results from minor imperfections in the geometry of the drum and end walls.

A slight warpage in the structure results in very high initial compliance. As preload stress is applied, the structure tends to "iron out." A further improvement in resonance frequency with increasing stress is due to the nonlinearity of the spring rate of cone-shaped structures. With a shallow cone (wall angle to axis near 90°) initial stresses with deflection are primarily bending stresses. However, compressive stresses in the wall increase rapidly, in turn, increasing the spring rate substantially with deflection.

The thin wall construction of the drum provides the additional advantage of extreme lightweight—perhaps one-tenth to one-twentieth that of more conventional drums of the same size. This is an important feature of the drum as it eliminates a number of the major causes of bearing failure—damage due to shock, vibration, misalignment, unbalanced loads and so on. Also, it permits the drum to be operative in relatively severe environments of mechanical and thermal shock, vibration, and so on. The light weight also permits the drum to be brought up to operating speed very rapidly and, in view of the relatively light load on the bearings, their life is greatly extended. Under normal operating conditions, the bearings are loaded only slightly above factory-adjusted preload conditions for the duplex pairs, and theoretically bearing life can be made to approach the bearing design limit of about 100,000 hours. (In conventionally mounted drums, bearing lifes of only 10,000 hours are difficult to achieve.)

While the drum of the invention has been shown to be stressed in the axial direction away from drum center, the drum also has good operating characteristics if it is stressed instead in the opposite direction. Such stress may be achieved by adjusting the shims of the end wall assembly 14 (mentioned above) to a longer dimension so as to cause compressive stress in the drum assembly in the axial direction. It is also to be understood that the generally truncated cone-shaped flexible end walls may be reversed in position, that is, the apex portion of the cones can face the housing end walls 14 and 16, respectively, and the base of the cones can face the center of the drum. Here too, the axial stress can be in either direction.

In general, it is preferable to have the forces on the cone-shaped flexure elements directed from the apex towards the base of the cones for shallow cones. The drum may be stressed inwardly or outwardly and for relatively long drums, the apex of the cones may be directed either way. In a very short drum, it is preferred that the apex of the cone face outwardly so as to increase the tortional stability of the drum about its suspension, that is, to separate the bearing assemblies as far as possible. Where space is a factor, as may be the case with long drums, the cone apexes should face inwardly to converse mounting space for the motors and in this way, to shorten the overall assembly. In general, it is usually desirable to place the drum under tension rather than compression to better "iron out" any distortions which may be present in the thin shell.

In general, it is desirable to place relatively high stress on the drum, however, if the stress is too high, this can seriously affect the life of the bearings. Therefore, in practice, the amount of stress employed is a compromise. In small drums, approximately 6 inches to 8 inches in diameter, it has been found that approximately 50 pounds of preload stress is a reasonable compromise, dependent somewhat on the specific applications for the drum. In one practical design, the stiffness of the drum end walls is made to be such that two-thousandths of an inch of preload displacement of the flexure end walls is required to obtain roughly 50 pounds of stress. This also permits a reasonable amount of tolerance in the shimming adjustment, as described above.

For the specific design illustrated in the present application, the bearing preload, as manufactured, was approximately 30 pounds. The drum preload, as described above, is nominally 50 pounds. The cone angle is about 80° relative to the drum axis prior to preloading the drum.

While the invention is illustrated to employ two motors, one at each end of the drum, in some forms of the invention where the drum is of relatively short axial length and economic factors are critical, only a single motor, at one end of the drum, may be employed. In this type of system, the bearing assemblies are the same as shown and only the electromagnetic rotor portion and stator portion of one motor are omitted.

What is claimed is:

1. In a magnetic drum system:
   a drum having an axis of rotation and flexible end walls intercepted by said axis;
   two bearings, each with two races, each bearing fixed at one of its races to a different end wall and each bearing being symmetrical to said axis;
   a housing in which said drum is mounted for rotation, the other race of each bearing being fixed to said housing; and
   means for axially stressing said drum comprising means for adjusting the spacing between the portions of said end walls which are close to the drum axis.

2. In a magnetic drum system as set forth in claim 1, said end walls being formed of metal.

3. In a magnetic drum system as set forth in claim 2, said end walls being of truncated cone shape.

4. In a magnetic drum system as set forth in claim 2, said end walls being of truncated cone shape with the apex of said truncated cones facing the drum center.

5. In a magnetic drum system:
   a housing having end walls;
   two bearings each with two races, each bearing fixed at one race to an end wall;
   a drum having an axis of rotation and flexible end walls through which said axis passes, the other race of each bearing being fixed to the respective drum end walls symmetrically of said axis; and
   means for axially stressing said drum comprising means for adjusting the positions of said drum end walls relative to said housing end walls in the direction of said axis.

6. In a magnetic drum system:
   a housing having a cylindrical opening therein; and
   a cylindrically shaped, relatively thin-walled, hollow drum located in said housing, said drum having a wall thickness less than 0.1 of an inch, which is a relatively small fraction of the housing thickness, means for facilitating the transfer of heat between said drum and said housing comprising locating the surface of said drum spaced over its entire extent from the inner surface of the housing by not more than about 0.03 inch.

7. In a magnetic drum system as set forth in claim 6, said drum comprising a hollow cylinder and flexure end walls closing the ends of said cylinder, said cylinder and end walls of said drum being of roughly the same thickness, that is, less than 0.1 of an inch.

8. In a magnetic drum system:
   a housing having a cylindrical opening therein;
   a cylindrically shaped, relatively thin-walled hollow drum located in said housing, said drum having a wall thickness which is a relatively small fraction of the housing thickness and being relatively closely spaced to the inner surface of said housing:
   flexure end walls closing the ends of said cylinder; and
   means, not passing through the cylinder, individually coupled to the flexure end walls of the drum, supporting said drum for rotation about the cylinder axis.

9. In a magnetic drum system as set forth in claim 8, further including means for adjusting the position of the center portion of one flexure end wall relative to the center portion of the other in the direction of the drum axis for placing the drum cylinder under stress in the axial direction of the drum and for maintaining it in this stressed condition during the rotation of the drum.

10. In a system for the storage of information, in combination:
    a magnetic drum comprising a hollow cylinder and flexure end walls closing the ends of said cylinder;
    two supporting means, not passing through the cylinder,
    means for placing said cylinder under stress in the axial direction of said cylinder comprising means for adjusting the spacing between said center portions of said flexure end walls.

11. In a system as set forth in claim 10, said flexure end walls being of conical shape and being symmetrically arranged relative to the drum center, that is, one being the mirror image of the other relative to the drum center.

12. In a system as set forth in claim 10, said last-named means comprising means for moving the center portions of said flexure end walls away from one another and for maintaining them in this position during rotation of the drum for maintaining the cylinder under axial tension during such rotation.

* * * * *

UNITED STATES PATENT OFFICE
CERTIFICATE OF CORRECTION

Patent No. 3,623,120     Dated November 23, 1971

Inventor(s)  Abraham Lichowsky

It is certified that error appears in the above-identified patent and that said Letters Patent are hereby corrected as shown below:

Claim 10, line 47, after "cylinder," insert
--supporting the drum for rotation at the respective center portions of said flexure end walls; and--

Signed and sealed this 25th day of April 1972.

(SEAL)
Attest:

EDWARD M. FLETCHER, JR.          ROBERT GOTTSCHALK
Attesting Officer                Commissioner of Patents